US010077706B2

(12) United States Patent
Arbel

(10) Patent No.: US 10,077,706 B2
(45) Date of Patent: Sep. 18, 2018

(54) THERMOSTAT ASSEMBLY WITH VARIABLE VALVE SEAT

(71) Applicant: M.A.P MOTORAD AUTOMOTIVE PARTS LTD., Misgav (IL)

(72) Inventor: Aviram Arbel, Hod Hasharon (IL)

(73) Assignee: M.A.P. MOTORAD AUTOMOTIVE PARTS LTD., Misgav (IL)

( * ) Notice: Subject to any disclaimer, the term of this patent is extended or adjusted under 35 U.S.C. 154(b) by 257 days.

(21) Appl. No.: 15/079,059

(22) Filed: Mar. 24, 2016

(65) Prior Publication Data

US 2016/0281587 A1    Sep. 29, 2016

Related U.S. Application Data

(60) Provisional application No. 62/137,831, filed on Mar. 25, 2015.

(51) Int. Cl.
*F01P 7/16* (2006.01)
*G05D 23/185* (2006.01)
*G05D 23/13* (2006.01)

(52) U.S. Cl.
CPC ............ *F01P 7/165* (2013.01); *F01P 7/167* (2013.01); *G05D 23/1333* (2013.01); *G05D 23/1852* (2013.01); *F01P 2037/00* (2013.01)

(58) Field of Classification Search
CPC .................... F01P 7/165; G05D 23/1852
USPC ................................. 236/99 K, 100
See application file for complete search history.

(56) References Cited

U.S. PATENT DOCUMENTS

| 5,174,254 A | 12/1992 | Humburg | |
| 6,820,817 B2* | 11/2004 | Leu | F01P 7/167 236/100 |
| 2007/0194137 A1* | 8/2007 | Goncze | G05D 23/1346 236/12.11 |

* cited by examiner

*Primary Examiner* — Keith Raymond
*Assistant Examiner* — Nael Babaa
(74) *Attorney, Agent, or Firm* — The Roy Gross Law Firm, LLC; Roy Gross

(57) ABSTRACT

A thermostat for controlling flow of a coolant fluid through an aperture, the thermostat including a temperature sensitive valve for controlling the opening and closing of the aperture, the temperature sensitive valve including: a valve body having a heat sensitive material and a displaceable pin; a flange configured to seal off the aperture when the temperature sensitive valve is closed; a support member and a flexible member located between the flange and the support member; the thermostat further including a valve seat and a control piston configured to control the position of the valve seat within the thermostat.

20 Claims, 7 Drawing Sheets

THERMOSTAT ASSEMBLY WITH VARIABLE VALVE SEAT

CROSS-REFERENCE TO RELATED APPLICATION

This is a non-provisional filing of U.S. provisional application No. 62/137,831 filed 25 Mar. 2015.

TECHNICAL FIELD

The present disclosure generally relates to the field of thermostat assemblies for controlling a flow of a fluid through an aperture.

BACKGROUND

Thermostats are extensively used to control the circulation of coolant in internal combustion engines. Typically, thermostats include valves having a closed body containing a thermally expandable material, such as wax. A spring is provided to urge the valve to a closed position such that in the resting or cooled state the valve is normally closed. Hence, when the engine is first started, the valve is closed, allowing only a bypass circulation of coolant fluid between the engine and the thermostat, thereby enabling the engine to attain its optimum running temperature more quickly.

Once the engine temperature rises, the temperature of the bypass circulated fluid increases, causing the wax within the valve body to melt and expand, consequently thrusting out a piston. As a result, the thrusted out piston causes the displacement of the valve from the valve seat, allowing flow of coolant fluid from a radiator to the engine. As the engine temperature drops, the wax temperature falls, the valve closes, returning to bypass circulation only.

There is still an unmet need for a device which is capable of fine-tuning the opening and closing of the valve on demand, to enable lower and/or higher Start-to-Open (STO) temperature.

SUMMARY

The present disclosure relates to thermostat valve assemblies having a valve seat connected to a control piston configured to control the seat position of the valve, and as a consequence thereof, to control the Start-to-Open (STO) temperature of the valve.

State of the art thermostats typically require the engine designer to determine an optimum engine temperature by deciding on properties of the wax, the spring urging the valve to be closed and/or additional parameters influencing the STO temperature of the valve. However, often there is a need for user modification of the STO temperature. For example, an engine operating at a higher temperature allows more complete fuel combustion and thereby produces less emission. Moreover, higher operating temperature improves fuel economy. On the other hand, a hotter running engine delivers less power. Thus, any single optimum engine temperature is a compromise between power, fuel economy and emissions level.

Advantageously, the thermostat, disclosed herein, enables adjustment of the STO temperature. For example, the thermostat enables lowering the position of the valve seat, thereby increasing a pre-load of the valve and, as a result thereof, affecting an elevation of the STO temperature. This may be particularly beneficial at the beginning of a drive and/or at low ambient temperatures in that it prevents unnecessary cooling of a cold engine, thereby improving fuel economy and also reducing pollution.

Similarly, the thermostat, disclosed herein, enables heightening the position of the valve seat, thereby overriding the STO temperature of the valve, by opening the valve regardless of the temperature and/or lowering the STO temperature of the valve. This allows the coolant to flow through the engine at a lower temperature, thereby reducing and maintaining a cooler engine temperature for high performance turbo applications.

Advantageously, the valve seat position may be lowered by exerting a force on the flange of the valve, thereby reducing the force required to increase the pre-load of a valve spring. This enables the thermostat, disclosed herein, to retain a similar size as standard thermostat assemblies and advantageously facilitates replacing the standard thermostat assembly with the adjustable valve seat thermostat, without requiring additional adjustments or modification of the engine.

According to some embodiments, there is provided a thermostat for controlling flow of a coolant fluid through an aperture.

According to some embodiments, the thermostat may include a temperature sensitive valve for controlling the opening and closing of the aperture. According to some embodiments, the temperature sensitive valve may include a valve body with a heat sensitive material and a displaceable pin. According to some embodiments, the displaceable pin may be at least partially inserted within the valve body and the heat sensitive material. According to some embodiments, the valve may include a flange configured to delimit the temperature sensitive valve from a top end thereof. According to some embodiments, the flange may be configured to seal off the aperture when the temperature sensitive valve is closed. According to some embodiments, the valve may include a support member configured to delimit the temperature sensitive valve from a bottom end thereof.

According to some embodiments, the thermostat may include a flexible member located between the flange and the support member. According to some embodiments, when the heat sensitive material is heated, the displaceable pin is at least partially thrust out from the valve body, thereby affecting a compression force on the flexible member. According to some embodiments, the compression force may cause the opening of the valve, thereby allowing flow of coolant fluid from a radiator through the aperture.

According to some embodiments, the thermostat may include a valve seat located circumferentially to the flange, wherein the flange is configured to seal against the valve seat.

According to some embodiments, the thermostat may include a control piston associated with the valve seat, wherein the control piston is configured to switch between a normal position, a lower position and a heightened position, thereby controlling a position of the valve seat within the thermostat. According to some embodiments, when the control piston is at the lower position, the valve seat exerts a compression force on an outer circumference of the flange, and subsequently on the flexible member.

According to some embodiments, the valve seat may exert the compression force on an upper side of the flange, such that the flange moves downwards towards the support member, consequently causing compression of the flexible member.

According to some embodiments, a start-to-open (STO) temperature required for displacing the valve from the valve seat is higher when the piston is in its lower position as compared to when the piston is in its normal position.

According to some embodiments, when the piston is at the heightened position, the valve seat is elevated relative to the flange, thereby opening the aperture without exerting a compression force on the flexible member.

According to some embodiments, when the piston is in its heightened position an STO temperature of the temperature sensitive valve is lower as compared to when the piston is in its normal position.

According to some embodiments, the thermostat may further include a second flexible member. According to some embodiments, when the piston is switched from the normal position to the lower position, the second flexible member remains in equilibrium. According to some embodiments, when the piston is switched from the normal position to the heightened position a compression force is exerted on the second flexible member.

According to some embodiments, the position of the support member may be fixed.

According to some embodiments, the valve seat may be functionally connected to the temperature sensitive valve.

According to some embodiments, the flexible member may be a spring.

According to some embodiments, the heat sensitive material may include a wax.

According to some embodiments, the temperature sensitive valve may be a linear characteristic valve.

According to some embodiments, there is provided a thermostat system for controlling a temperature of an engine.

According to some embodiments, the system may include a radiator configured to cool a coolant fluid.

According to some embodiments, the system may include a temperature sensitive valve for controlling the opening and closing of the aperture. According to some embodiments, the temperature sensitive valve may include a valve body with a heat sensitive material and a displaceable pin; wherein the displaceable pin is at least partially inserted within the heat sensitive material. According to some embodiments, the temperature sensitive valve may include a flange configured to delimit the temperature sensitive valve from a top end thereof, the flange configured to seal off the aperture when the temperature sensitive valve is closed. According to some embodiments, the temperature sensitive valve may include a support member configured to delimit the temperature sensitive valve from a bottom end thereof. According to some embodiments, the temperature sensitive valve may include a flexible member located between said flange and the support member. According to some embodiments, when the heat sensitive material is heated, the displaceable pin is at least partially thrusted out from the valve body, thereby affecting a compression force on the flexible member, the compression force opening the valve, thereby allowing flow of coolant fluid from the radiator through the aperture.

According to some embodiments, the system may include a valve seat located circumferentially to the flange, wherein the flange is configured to seal against the valve seat.

According to some embodiments, the system may include a control piston associated with the valve seat, wherein the control piston is configured to switch between a normal position, a lower position and a heightened position, thereby controlling a position of the valve seat within the thermostat. According to some embodiments, when the control piston is at the lower position, the valve seat exerts a compression force on an outer circumference of the flange, and subsequently on the flexible member.

According to some embodiments, the system may include a bypass circuitry configured to circulate the coolant fluid between the engine and the thermostat.

According to some embodiments, the system may include a pump configured to pump coolant fluid from the thermostat to the engine.

Certain embodiments of the present disclosure may include some, all, or none of the above advantages. One or more technical advantages may be readily apparent to those skilled in the art from the figures, descriptions and claims included herein. Moreover, while specific advantages have been enumerated above, various embodiments may include all, some or none of the enumerated advantages.

BRIEF DESCRIPTION OF THE DRAWINGS

Examples illustrative of embodiments are described below with reference to figures attached hereto. In the figures, identical structures, elements or parts that appear in more than one figure are generally labeled with a same numeral in all the figures in which they appear. Alternatively, elements or parts that appear in more than one figure may be labeled with different numerals in the different figures in which they appear. Dimensions of components and features shown in the figures are generally chosen for convenience and clarity of presentation and are not necessarily shown in scale. The figures are listed below.

DETAILED DESCRIPTION

Figure 1A:
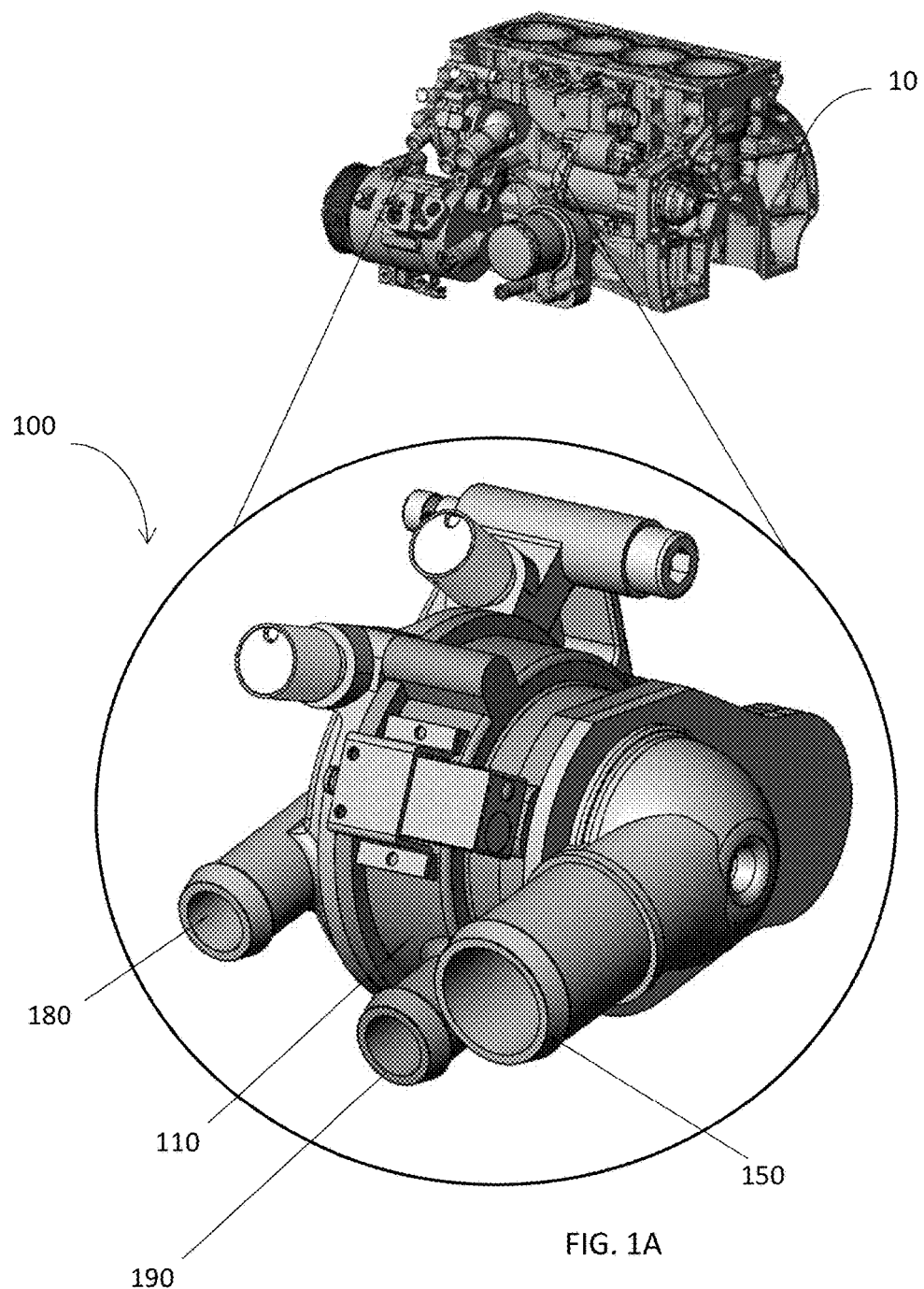
FIG. 1A schematically shows a combustion engine comprising an apparatus configured to control the flow of a coolant fluid from a radiator to an engine, according to some embodiments.

In the following description, various aspects of the disclosure will be described. For the purpose of explanation, specific configurations and details are set forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure.

The present invention provides a thermostat for controlling a temperature of an engine by controlling a flow of a coolant fluid from a heat exchanger, such as a radiator, to the engine. The thermostat includes a temperature sensitive valve for controlling the opening and closing of an aperture, through which the coolant fluid cooled by the radiator can enter the thermostat and subsequently the engine.

The thermostat further includes a valve seat, directly or indirectly, connected to a control piston configured to control the position of the valve seat and thereby the pre-load on the valve. According to some embodiments, the valve seat may be functionally connected to the temperature sensitive valve.

As used herein, the terms "aperture" and "valve opening" may be interchangeably used and may refer to the narrowest point through which the fluid passes at any time.

As used herein, the term "valve seat" may refer to part of the thermostat against which the temperature sensitive valve seals.

As used herein the term "control piston" may refer to a mechanism configured to control the position of the seat within the thermostat. According to some embodiments, the control piston may be a hydraulically activated piston. According to other embodiments, the control piston may be a mechanically or an electromechanically activated piston.

As used herein the term "pre-load" may refer to a degree of compression and/or stretching of the spring which is unrelated to engine temperature.

By varying the valve seat position, the thermostat, disclosed herein, enables cooling of the engine, by opening the valve either at a predefined engine temperature and/or at an engine temperature defined by the instant engine demand. The thermostat is further configured to terminate cooling of the engine, at the predefined engine temperature and/or at the temperature defined by the instant engine demand. The thermostat, disclosed herein, thus allows a more precise control of the engine temperature, which in turn allows improved fuel utilization and/or engine power, in line with the engine demand.

According to some embodiments, the thermostat, disclosed herein, may be configured to facilitate elevating the predetermined Start-to-Open (STO) temperature of the valve, thereby increasing the engine temperature and fuel utilization. According to some embodiments, the thermostat, disclosed herein, may be configured to facilitate lowering the predetermined Start-to-Open (STO) temperature of the valve, thereby increasing engine power.

The term "Start to Open (STO) temperature", as used herein, refers to a temperature range, at which the thermostat valve is configured to open and to allow coolant fluid flow from the radiator to the engine. As used herein, the term "predetermined STO temperature" may refer to the default STO temperature set by the manufacturer.

According to some embodiments, the thermostat may be a typical thermostat, including a temperature responsive valve for blocking and unblocking the flow of coolant fluid from a heat exchanger. The temperature sensitive valve includes a displaceable and/or thermally actuated pin configured to allow the valve opening, in response to an increase in the temperature of the coolant fluid. The temperature sensitive valve further includes a spring, configured to exert pressure on the temperature responsive valve so as to resist opening of the valve and/or to force closing of the valve, when the temperature of the coolant fluid decreases.

According to some embodiments, the temperature sensitive valve may have a predetermined inherent flow characteristic, which defines the relationship between the valve opening and the flowrate under constant pressure conditions. It is understood that the relationship between flowrate and aperture pass area is directly proportional. However, different valve characteristics may give different valve openings for the same pass area. The physical shape of the valve and seat arrangement, sometimes referred to as the valve 'trim', causes a difference in valve opening between these valves. According to some embodiments, the valve may be sized and shaped to improve the flow characteristics of the coolant fluid through the aperture.

According to some embodiments, the valve may be a fast opening valve. As used herein, the term "fast opening valve" may refer to a valve in which a small lift of the valve from the closed position results in a large change in flowrate. As a non-limiting example, a valve lift of 50% may result in an orifice pass area and flowrate of up to 90% of its maximum potential. According to some embodiments, the fast opening valve may have a shape of a flipped flat bowl. According to some embodiments, the fast opening valve, its flange and/or lid, may at least partially have a convex shape. According to some embodiments, the linear characteristic valve, its flange and/or lid, may at least partially have a convex shape.

According to some embodiments, the valve may be a linear characteristic valve. As used herein, the term "linear characteristic valve" refers to a valve having a flowrate directly proportional to the valve lift, at a constant differential pressure. A linear valve achieves this by having a linear relationship between the valve lift and the orifice pass area. According to some embodiments, the linear characteristic valve may have a shape of a dome. According to some embodiments, the linear characteristic valve, its flange and/or lid, may at least partially have a concave shape.

According to some embodiments, the valve may be a logarithmic valve. As used herein the term "logarithmic valve" refers to a valve in which each increment in valve lift increases the flowrate by a certain percentage of the previous flow. According to some embodiments, the linear characteristic valve, its flange and/or lid, may at least partially have a concave and a convex shape.

According to some embodiments, the temperature sensitive valve may include a valve body comprising a heat sensitive material and a displaceable pin. According to some embodiments, the displaceable pin may be at least partially inserted within the valve body and the heat sensitive material. According to some embodiments, the heat sensitive material may be a wax. According to some embodiments, the heat sensitive material may be configured to melt and expand at a temperature in the range of 90° C.-95° C., in the range of 91° C.-94° C. or in the range of 91° C.-93° C. Each possibility is a separate embodiment.

According to some embodiments, the valve may include a flange configured to delimit the temperature sensitive valve from a top end thereof. According to some embodiments, the flange may include an upper lid. According to some embodiments, the flange may have a form of a disc. According to some embodiments, the flange may be essentially flat. According to some embodiments, the flange may be essentially dome formed. According to some embodiments, at least part of the flange may have concave shape. According to some embodiments, the flange may have a size and shape configured to improve the flow characteristics of the coolant fluid through the aperture. According to some embodiments, the flange may be sized and shaped to ensure a gradual increase of flow of the coolant fluid throughout the opening of the valve. According to some embodiments, the flange may be sized and shaped to prevent a burst in the flow of coolant fluid through the aperture.

According to some embodiments, the temperature sensitive valve may include a support member configured to delimit the temperature sensitive valve from a bottom end thereof. According to some embodiments, the support member may be a bridge. According to some embodiments, the support member may be fixed within the thermostat, thereby providing contra to a downward movement of the flange.

According to some embodiments, the temperature sensitive valve may include a flexible member located between the flange and the support member. According to some embodiments, the flexible member may be a spring. According to some embodiments, the spring may have a spring constant in the range of 100-300 Newton/meter, 150-250 Newton/meter, 175-225 Newton/meter. Each possibility is a separate embodiment. According to some embodiments, the spring may have a spring constant of 200 Newton/meter.

According to some embodiments, when the heat sensitive material is heated, the displaceable pin may be at least partially thrust out from the valve body. According to some embodiment, when the displaceable pin is thrust out from the valve body it may encounter a niche formed within the thermostat and configured to provide contra to the displacement of the displaceable pin, thereby affecting a compression force on the flexible member. According to some embodiments, the compression force exerted on the flexible member may gradually displace the temperature sensitive valve from the valve seat, thereby allowing flow of coolant fluid from a radiator through the aperture.

According to some embodiments, when the valve seals off the aperture, the coolant fluid flows in a bypass circuitry between the engine and the thermostat.

According to some embodiments, when the valve is displaced from the valve seat, the coolant fluid flows through a heat exchanger, such as a radiator, where it gets cooled, prior to being circulated back to the engine.

According to some embodiments, the control piston of the thermostat may be configured to switch at least between a normal position, a lower position and a heightened position. As used herein, the term "normal position" refers to a state in which the control piston, and thus the valve seat, is positioned such that the STO temperature of the valve is a predetermined STO temperature, defined by the manufacturer.

According to some embodiments, when the control piston, and thus the valve seat, is in its normal position the STO temperature of the valve is 92° C. According to some embodiments, when the control piston, and thus the valve seat, is in its normal position, no compression force is exerted on the flexible member.

According to some embodiments, when the control piston is lowered to a lower position, the valve seat is also lowered, thereby exerting a compression force on the flange, and subsequently on the flexible member, without displacing the valve from the aperture. According to some embodiments, the valve seat may exert the compression force on an upper side of the flange, such that the flange moves downwards towards the support member, consequently causing compression of the flexible member. According to some embodiments, the valve seat may exert the compression force on an outer circumference of the flange. It is understood by one of ordinary skill in the art, that by exerting the force on an outer circumference of the flange, the force required to cause compression of the spring and thus to increase the pre-load on the spring, is reduced, as compared to the force required to compress the spring when exerting the force directly on the spring. According to some embodiments, due to the increased pre-load on the spring, the start-to-open (STO) temperature required for displacing the valve from the aperture is higher when the control piston, and thus the valve seat, is in its lower position, as compared to when the control piston, and thus the valve seat, is in its normal position.

According to some embodiments, when the control piston is raised to its heightened position, the valve seat is elevated relative to the flange, thereby opening the aperture without exerting a compression force (or exerting a default compression force only) on the flexible member. According to some embodiments, raising the control piston to its heightened position, may serve to override the predetermined STO temperature. According to some embodiments, when the control piston is raised to its heightened position, the STO temperature of the temperature sensitive valve is lower, as compared to when the piston is in its normal position.

According to some embodiments, the thermostat may further include a second flexible member. According to some embodiments, the second flexible member may be a spring. According to some embodiments, the second flexible member may be functionally connected to the control piston. According to some embodiments, when the piston is switched from its normal position to its lower position the second flexible member remains in equilibrium and no force is exerted thereon.

As used herein, the term "equilibrium" refers to a state in which the flexible member is in its relaxed form, i.e. not being stretched or compressed.

According to some embodiments, when the control piston is switched from its normal position to its heightened position, a compression force is exerted on the second flexible member. According to some embodiments, when the control piston is deactivated such that the compression force on the second flexible member is relieved, the control piston, and thus the valve seat, returns to its normal position.

Reference is now made to FIG. 1A which schematically shows a combustion engine 10 including an apparatus 100 configured to control the flow of a coolant fluid to combustion engine 10; according to some embodiments. Apparatus 100 includes a thermostat 110 configured to control the flow of coolant fluid from a radiator, through radiator passage 150 to engine 10 through engine passage 180. Apparatus 100 may further be configured to control the flow of coolant fluid to a reservoir/heater 190.

Figure 1B:
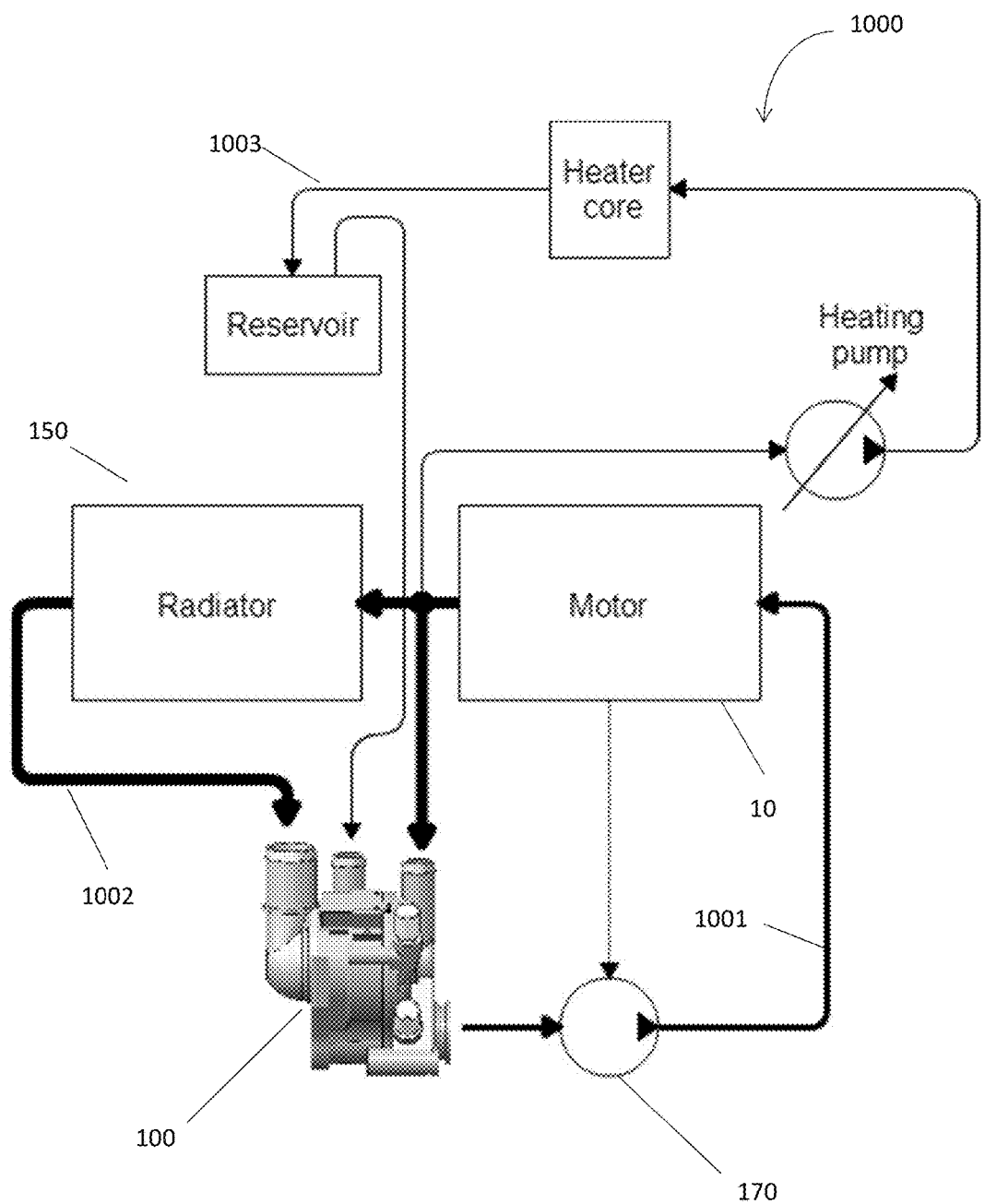
FIG. 1B shows an illustrative operation scheme of an apparatus configured to control the flow of a coolant fluid from a radiator to an engine, according to some embodiments.

Reference is now made to FIG. 1B which shows an illustrative operation scheme 1000 of an apparatus 100 (shown in FIG. 1A) configured to control the flow of a coolant fluid from a radiator to an engine, according to some embodiments. Apparatus 100 includes a thermostat (depicted as 110 in FIG. 1A) configured to block or allow flow of coolant fluid from a radiator (through a radiator passage depicted as 150 in FIG. 1A) to engine 10 through engine passage 180. When the coolant fluid is below an STO temperature, it circulates through bypass circuit 1001 between apparatus 100 and engine/motor 10 by means of pump 170. However, as the temperature of the coolant fluid reaches the STO temperature of thermostat 110, a thermostat valve opens, thereby allowing the coolant fluid to circulate through cooling circuit 1002, i.e. allowing coolant fluid cooled by the radiator to flow from radiator passage 150 to engine 10 through thermostat 110 by means of pump 170.

Apparatus 100 further allows circulation of coolant fluid through heating circuit 1003 enabling utilizing the heat generated by engine 10.

Figure 2A:
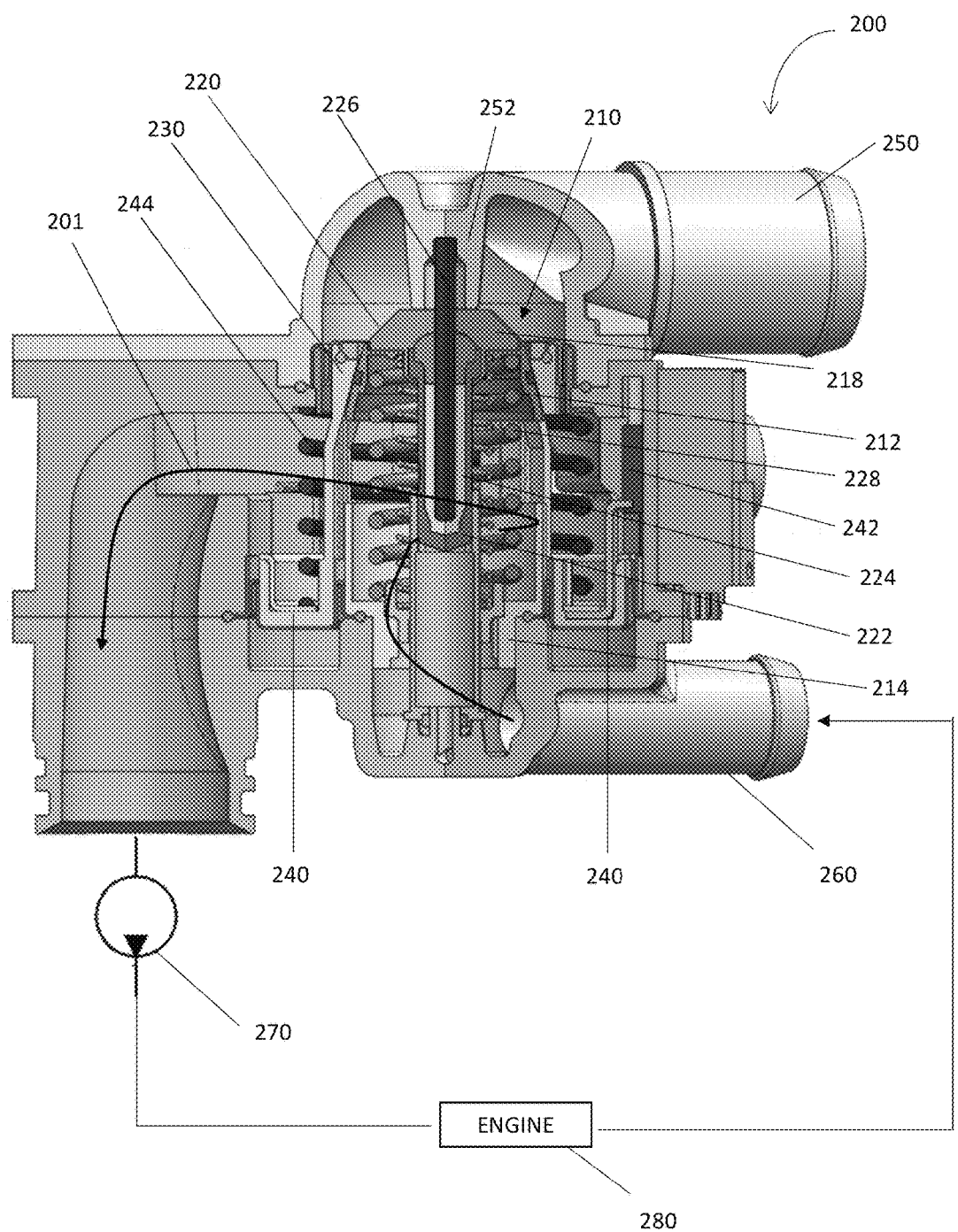
FIG. 2A schematically shows a cross-sectional view of an apparatus configured to control the flow of a coolant fluid from a radiator to an engine in its closed operation mode, the apparatus including a thermostat having an adjustable valve seat in its normal position, according to some embodiments.

Reference is now made to FIG. 2A, which schematically shows a cross-sectional view of an apparatus 200 configured to control the flow of a coolant fluid from a radiator (not shown) through radiator passage 250 to an engine (such as engine 10 of FIG. 1A) through engine passage 280 in its closed operation mode. Apparatus 200 includes a thermostat 210 having a temperature sensitive valve 220 configured to block or allow flow of coolant fluid from radiator passage 250 to engine passage 280 through thermostat 210. Temperature sensitive valve 220 is here depicted as a linear characteristic valve configured to optimize the flow of coolant fluid when opened; however, fast opening valves or logarithmic valves may likewise be utilized and fall within the scope of this disclosure. Temperature sensitive valve 220 includes a valve body 222 containing a heat sensitive material 224 configured to expand above a predetermined temperature, and a displaceable pin 226 partially disposed within heat sensitive material 224 and partially projecting into niche 252 of thermostat 210. Temperature sensitive valve 220 further includes an upper lid 218 and a flange 212 associated with or integrally formed with upper lid 218. Displaceable pin 226 is movably disposed through upper lid 218. Thermostat 210 further includes a valve seat 230 located circumferentially to flange 212. In its closed operation mode (as depicted in FIG. 2A), flange 212 of temperature sensitive valve 220 seals against valve seat 230, thereby preventing flow of coolant fluid from radiator passage 250 to engine passage 280, through thermostat 210. Consequently, the coolant fluid circulates from the engine through a bypass channel 260, to thermostat 210, and back to the engine, by the means of a pump 270, as denoted by arrow 201. Temperature sensitive valve 220 further includes a spring 228 positioned between upper lid 218 and a support member 214. Spring 228 is configured to force closing of the temperature sensitive valve, as long as a predetermined STO temperature (T1) has not been reached. Valve seat 230 is functionally connected to (or integrally formed with) a control piston 240 configured to control the position of valve seat 230 within thermostat 210. The operation of control piston 240 may be controlled by an actuator, such as hydraulic actuator 242. In the depicted normal position of control piston 240, valve seat 230 is in its default position in which no (or only default) compression force is exerted on spring 228, prior to reaching the STO temperature (T1). That is, when thermostat 210 is in its closed operation mode and when valve seat 230 is in its default position, spring 228 is in equilibrium, forcing flange 212 of temperature sensitive valve 220 to seal with valve seat 230, thereby preventing flow of coolant fluid from radiator passage 250 to engine passage 280. Thermostat 210 further includes a second spring 244 functionally connected to piston 240. Second spring 244 is configured to be in its relaxed state when control piston 240 is in its normal position.

Figure 2B:
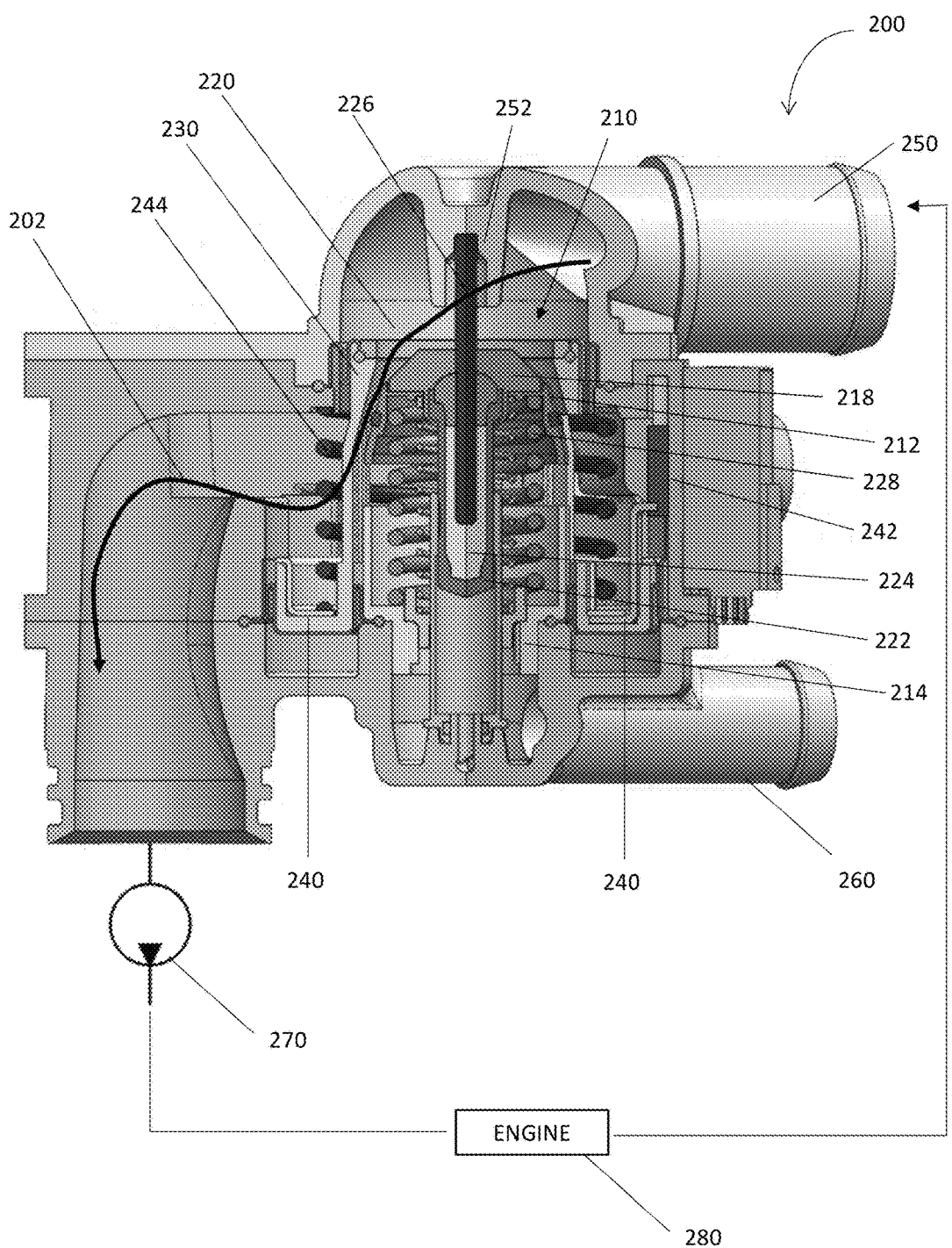
FIG. 2B schematically shows a cross-sectional view of an apparatus configured to control the flow of a coolant fluid from a radiator to an engine in its open operation mode, the apparatus including a thermostat having an adjustable valve seat in its normal position, according to some embodiments.

Reference is now made to FIG. 2B, which schematically shows a cross-sectional view of apparatus 200 in its open operation mode. Apparatus 200 includes thermostat 210 with temperature sensitive valve 220 configured to block or allow flow of coolant fluid from radiator passage 250 to engine passage 280 through thermostat 210. Temperature sensitive valve 220 includes valve body 222 containing heat sensitive material 224 configured to expand above the predetermined STO temperature (T1), and displaceable pin 226. When the coolant fluid gets heated to or above the predetermined STO temperature (T1), heat sensitive material 224 expands, thereby causing displaceable pin 226 to be partially thrust out of valve body 222. Due to the contra force provided by niche 252 to the displacement of pin 226, spring 228 is compressed, leading temperature sensitive valve 220 to be gradually displaced from valve seat 230, thereby generating a pass for coolant fluid cooled by radiator, from radiator passage 250, to thermostat 210 and, by means of pump 270, to engine passage 280, as denoted by arrow 202. That is, when thermostat 210 is in its open operation mode and when valve seat 230 is in its default position, spring 228 is compressed, forcing flange 212 of temperature sensitive valve 220 to detach from valve seat 230, thereby allowing flow of coolant fluid from radiator passage 250 through engine passage 280.

Figure 2C:
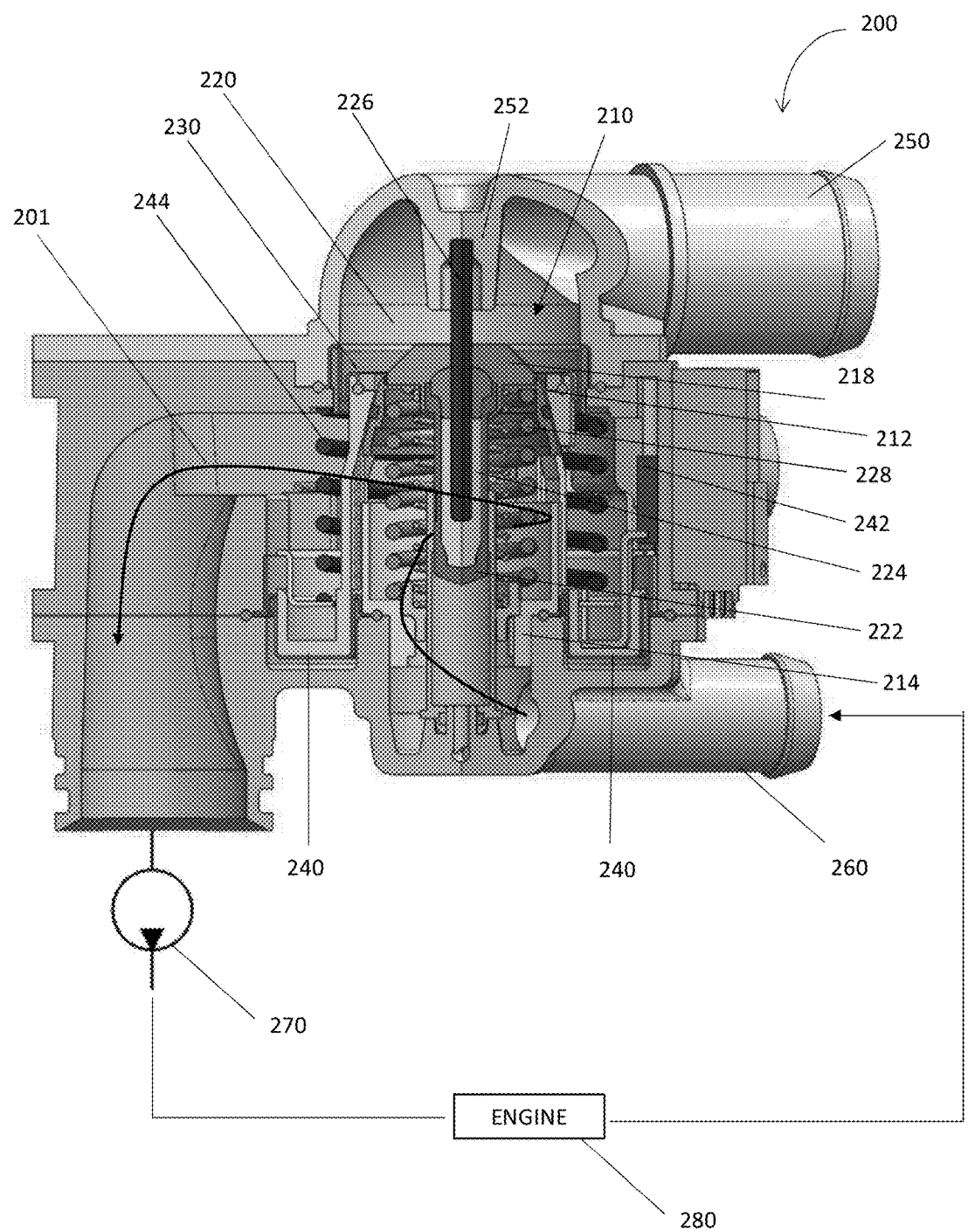
FIG. 2C schematically shows a cross-sectional view of an apparatus configured to control the flow of a coolant fluid from a radiator to an engine in its closed operation mode, the apparatus including a thermostat having an adjustable valve seat in its lowered position, according to some embodiments.
Figure 2D:
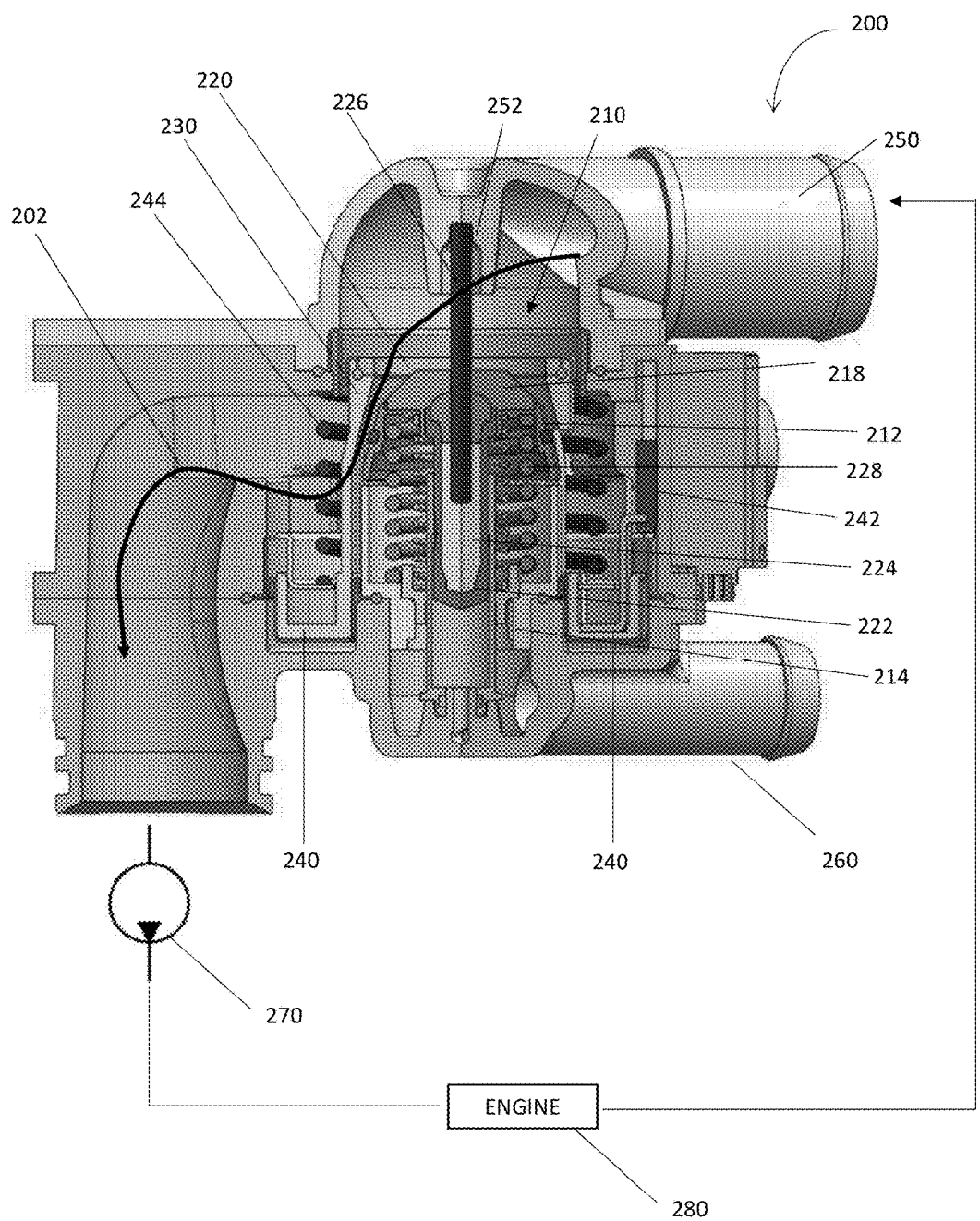
FIG. 2D schematically shows a cross-sectional view of an apparatus configured to control the flow of a coolant fluid from a radiator to an engine in its open operation mode, the apparatus including a thermostat having an adjustable valve seat in its lowered position, according to some embodiments.

Reference is now made to FIGS. 2C and 2D, which schematically shows a cross-sectional view of apparatus 200, having control piston 240, and thus valve seat 230, in a lowered position. Due to the lowered position of valve seat 230, a compression force is exerted on flange 212 and thus on spring 228 prior to engine temperature reaching the predetermined STO temperature (T1). As a result, a new and higher STO temperature (T2, wherein T2>T1) must be reached for valve 220 to be displaced from valve seat 230. In its closed operation mode (depicted in FIG. 2C), flange 212 of temperature sensitive valve 220 seals against the lowered valve seat 230, thereby preventing flow of coolant fluid from radiator passage 250 to engine passage 280, through thermostat 210. Consequently, the coolant fluid circulates from the engine through bypass channel 260, through thermostat 210 and back to the engine, by the means of a pump 270, as denoted by arrow 201. When the coolant fluid is heated to the previous predetermined STO temperature (T1), the valve remains closed, as additional compression of spring 228 is required, for temperature sensitive valve 220 to be displaced from valve seat 230. Flow of coolant fluid from radiator passage 250 thus remains blocked. Only when the coolant fluid gets heated above the new and higher STO temperature (T2) (as depicted in FIG. 2D), will the force generated by the expansion of heat sensitive material 224 and the thrusting out of displaceable pin 226 be enough to displace temperature sensitive valve 220 from valve seat 230, thereby generating a pass allowing coolant fluid cooled by the radiator to flow from radiator passage 250 to thermostat 210 and subsequently to enter engine passage 280, by means of pump 270, as denoted by arrow 202. It is understood that this operation mode of apparatus 200 enables to circumvent cooling of the engine even when the predetermined STO has been reached. This may be particularly beneficial at the beginning of a drive and/or at low ambient temperatures in that it prevents unnecessary cooling of a cold engine, thereby improving fuel economy and also reducing pollution.

Figure 2E:
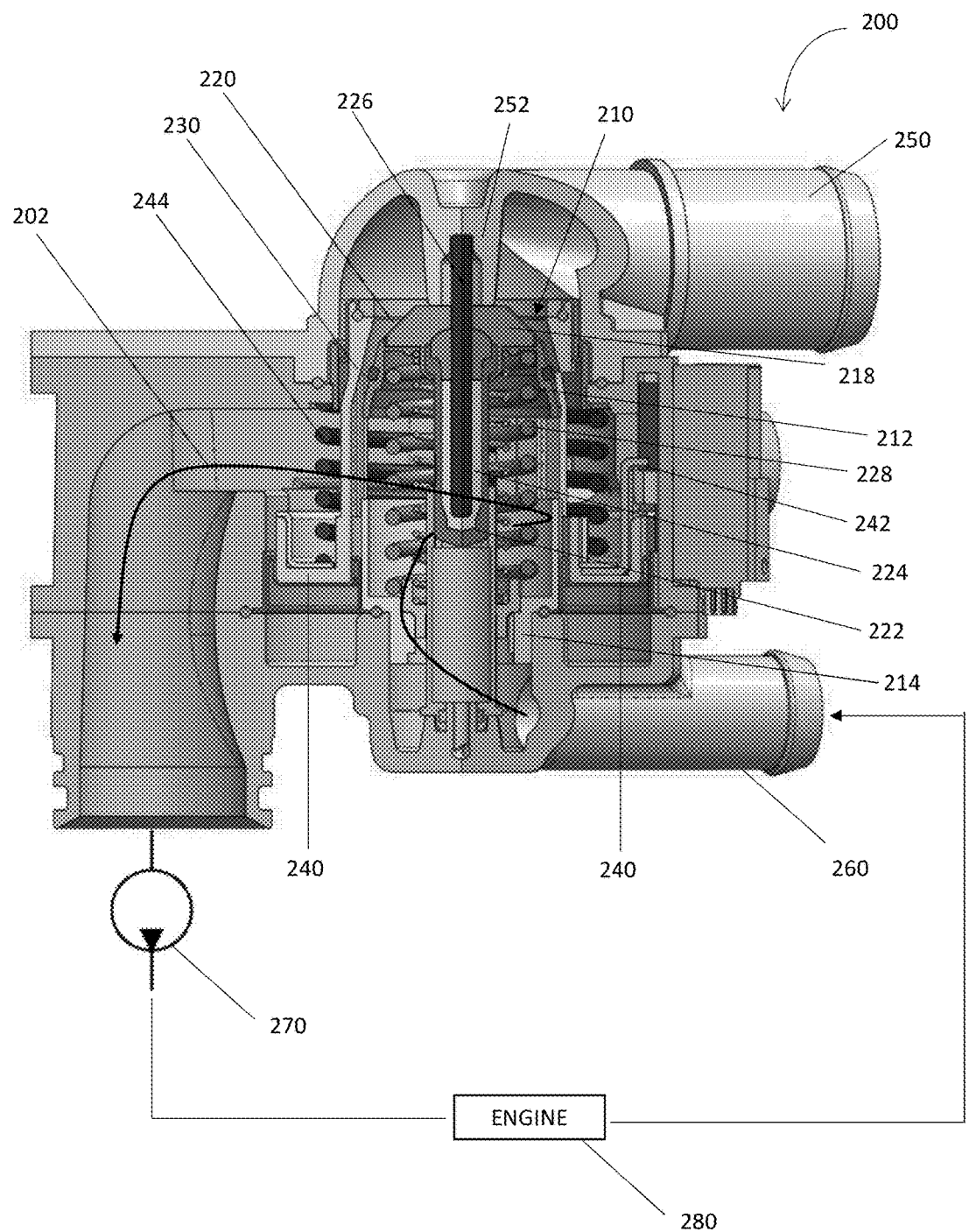
FIG. 2E schematically shows a cross-sectional view of an apparatus configured to control the flow of a coolant fluid from a radiator to an engine in its open operation mode, the apparatus including a thermostat having an adjustable valve seat in its heightened position, according to some embodiments.

Reference is now made to FIG. 2E, which schematically shows a cross-sectional view of apparatus 200 having control piston 240, and thus valve seat 230, in a heightened position. Due to the heightened position of valve seat 230, temperature sensitive valve 220 is upwardly displaced from valve seat 230 prior to the temperature of the coolant fluid having reached the predetermined STO temperature (T1), and without compression of spring 228, thereby overriding the function of valve 220 and allowing flow of coolant fluid from radiator passage 250 to engine passage 280, through thermostat 210, as denoted by arrow 202. Furthermore, when control piston 240 is raised to its higher position, a compression force is exerted on second spring 244. Thus, when the control piston is deactivated, second spring 244 will urge control piston 240, and thus valve seat 230, to return to normal position. It is understood that this operation mode of apparatus 200 enables cooling the engine even when the predetermined STO has not been reached, thereby reducing and maintaining a cooler engine temperature with higher engine power, which may be particularly beneficial for high performance turbo applications.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, or components, but do not preclude or rule out the presence or addition of one or more other features, integers, steps, operations, elements, components, or groups thereof.

While a number of exemplary aspects and embodiments have been discussed above, those of skill in the art will recognize certain modifications, additions and sub-combinations thereof. It is therefore intended that the following appended claims and claims hereafter introduced be interpreted to include all such modifications, additions and sub-combinations as are within their true spirit and scope.

What is claimed is:

1. A thermostat for controlling flow of a coolant fluid through an aperture, the thermostat comprising:
   a temperature sensitive valve for controlling the opening and closing of the aperture, said temperature sensitive valve comprising:
      a valve body comprising a heat sensitive material and a displaceable pin; wherein said displaceable pin is at least partially inserted within said valve body and said heat sensitive material;
      a flange configured to delimit the temperature sensitive valve from a top end thereof, said flange configured to seal off said aperture when said temperature sensitive valve is closed;
      a support member configured to delimit the temperature sensitive valve from a bottom end thereof;
      a member located between said flange and said support member; wherein when said heat sensitive material is heated, said displaceable pin is at least partially thrust out from said valve body, thereby affecting a compression force on said member, said compression force opening said valve, thereby allowing flow of coolant fluid from a radiator through said aperture; and
   a valve seat located circumferentially to said flange, wherein said flange is configured to seal against said valve seat; and
   a control piston associated with said valve seat, wherein said control piston is configured to switch between a normal position, a lower position and a heightened position, thereby controlling a position of said valve seat within said thermostat; wherein when said control piston is at the lower position, said valve seat exerts a compression force on an outer circumference of said flange, and subsequently on said member;
   wherein a start-to-open (STO) temperature required for displacing said valve from said valve seat is higher when said piston is in the lower position as compared to when said piston is in the normal position.

2. The thermostat of claim 1, wherein said valve seat exerts said compression force on an upper side of said flange, such that said flange moves downwards towards said support member, consequently causing compression of said member.

3. The thermostat of claim 1, wherein when said piston is at said heightened position, said valve seat is elevated relative to said flange, thereby opening said aperture without exerting a compression force on said member.

4. A thermostat for controlling flow of a coolant fluid through an aperture, the thermostat comprising:
   a temperature sensitive valve for controlling the opening and closing of the aperture, said temperature sensitive valve comprising:
      a valve body comprising a heat sensitive material and a displaceable pin; wherein said displaceable pin is at least partially inserted within said valve body and said heat sensitive material;
      a flange configured to delimit the temperature sensitive valve from a top end thereof, said flange configured to seal off said aperture when said temperature sensitive valve is closed; and
      a support member configured to delimit the temperature sensitive valve from a bottom end thereof;
      a member located between said flange and said support member; wherein when said heat sensitive material is heated, said displaceable pin is at least partially thrust out from said valve body, thereby affecting a compression force on said member, said compression force opening said valve, thereby allowing flow of coolant fluid from a radiator through said aperture; and
   a valve seat located circumferentially to said flange, wherein said flange is configured to seal against said valve seat; and
   a control piston associated with said valve seat, wherein said control piston is configured to switch between a normal position, a lower position and a heightened position, thereby controlling a position of said valve seat within said thermostat; wherein when said control piston is at the lower position, said valve seat exerts a compression force on an outer circumference of said flange, and subsequently on said member;
   wherein when said piston is in the heightened position a STO temperature of said temperature sensitive valve is lower as compared to when said piston is in the normal position.

5. The thermostat of claim 1, further comprising a second member.

6. The thermostat of claim 5, wherein when said piston is switched from said normal position to said lower position, said second member remains in equilibrium.

7. The thermostat of claim 5, wherein when said piston is switched from said normal position to said heightened position a compression force is exerted on said second member.

8. The thermostat of claim 1, wherein the position of said support member is fixed.

9. The thermostat of claim 1, wherein said valve seat is functionally connected to said temperature sensitive valve.

10. The thermostat of claim 1, wherein said member is a spring.

11. The thermostat of claim 1, wherein said heat sensitive material comprises wax.

12. The thermostat of claim 1, wherein said temperature sensitive valve is a linear characteristic valve.

13. The thermostat of claim 4, wherein said valve seat exerts said compression force on an upper side of said flange, such that said flange moves downwards towards said support member, consequently causing compression of said member.

14. The thermostat of claim 4, wherein when said piston is at said heightened position, said valve seat is elevated relative to said flange, thereby opening said aperture without exerting a compression force on said member.

15. The thermostat of claim 1, further comprising a second member.

16. The thermostat of claim 15, wherein when said piston is switched from said normal position to said lower position, said second member remains in equilibrium and wherein when said piston is switched from said normal position to said heightened position a compression force is exerted on said second member.

17. The thermostat of claim 4, wherein the position of said support member is fixed.

18. The thermostat of claim 4, wherein said member is a spring.

19. The thermostat of claim 4, wherein said temperature sensitive valve is a linear characteristic valve.

20. The thermostat of claim 4, wherein a start-to-open (STO) temperature required for displacing said valve from said valve seat is higher when said piston is in the lower position as compared to when said piston is in the normal position.

* * * * *